United States Patent
Dong

(10) Patent No.: US 10,467,730 B2
(45) Date of Patent: Nov. 5, 2019

(54) IMAGE-PROCESSING APPARATUS TO REDUCE STAIRCASE ARTIFACTS FROM AN IMAGE SIGNAL

(71) Applicant: SONY CORPORATION, Tokyo (JP)

(72) Inventor: Xiaogang Dong, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/922,178

(22) Filed: Mar. 15, 2018

(65) Prior Publication Data
US 2019/0287218 A1   Sep. 19, 2019

(51) Int. Cl.
G06T 5/00 (2006.01)
G06K 9/62 (2006.01)
G06K 9/32 (2006.01)

(52) U.S. Cl.
CPC ............ G06T 5/002 (2013.01); G06K 9/3233 (2013.01); G06K 9/6267 (2013.01)

(58) Field of Classification Search
CPC .......... H04N 5/357; G06T 5/002; G06K 9/40; G06K 9/3233; G06K 9/6267
USPC ........................................................ 382/275
See application file for complete search history.

(56) References Cited

U.S. PATENT DOCUMENTS

| 5,218,649 | A  | * | 6/1993  | Kundu ...................... G06T 5/20 348/625 |
| 8,374,457 | B1 |   | 2/2013  | Wang et al. |
| 9,171,355 | B2 | * | 10/2015 | Zhuo ........................ G06T 5/002 |
| 2012/0200754 | A1 | * | 8/2012  | Fainstain ................ G06T 5/002 348/302 |
| 2016/0180504 | A1 | * | 6/2016  | Kounavis ................ G06T 5/002 348/241 |
| 2017/0347126 | A1 |   | 11/2017 | Shoa |

OTHER PUBLICATIONS

Zhang, et al., "Image Denoising Using Total Variation Model Guided by Steerable Filter", Mathematical Problems in Engineering, vol. 2014, Article ID 423761, Oct. 7, 2013, 07 pages.
Buades, et al., "The staircasing effect in neighborhood filters and its solution", IEEE Transactions on Image Processing, vol. 15, No. 6, Jun. 2006, pp. 1499-1505.
Choudhury, et al., "The Trilateral Filter for High Contrast Images and Meshes", Eurographics Symposium on Rendering, 2003, pp. 1-11.
Extended European Search Report of EP Application No. 19157521.6, dated May 22, 2019, 08 pages of EESR.

* cited by examiner

*Primary Examiner* — Daniel G Mariam
(74) *Attorney, Agent, or Firm* — Chip Law Group

(57) ABSTRACT

An image-processing apparatus and method for reducing or removing staircase artifacts comprises an image sensor and circuitry. The image sensor is configured to capture an input image signal. The circuitry is configured to identify a first portion of the input image signal that exhibits a staircase artifact. The circuitry is further configured to generate a slope signal based on a steepness parameter of a slope that corresponds to the first region-of-interest based on the identification. The circuitry is configured to generate a difference signal based on a difference between the first portion of the input image signal and the generated slope signal. The circuitry is configured to generate a de-noised image signal based on the generated difference signal and the generated slope signal to reduce the staircase artifact in the first portion of the input image signal.

22 Claims, 10 Drawing Sheets

IMAGE-PROCESSING APPARATUS TO REDUCE STAIRCASE ARTIFACTS FROM AN IMAGE SIGNAL

CROSS-REFERENCE TO RELATED APPLICATIONS/INCORPORATION BY REFERENCE

None.

FIELD

Various embodiments of the disclosure relate to image sensor and camera technologies. More specifically, various embodiments of the disclosure relate to image-processing apparatus to reduce staircase artifacts from an image signal.

BACKGROUND

Recent advancements in the field of camera technologies and consumer electronic (CE) devices are largely due to rapid technological developments in image-processing techniques. Due to recent advancements in the field of camera technologies, cameras of today enable users to capture images at low light conditions. An image captured at a low-light condition may comprise one or more regions with slow varying color or luminosity. In cases where the captured image is riddled with noisy patches, a conventional image-processing apparatus may de-noise the captured image. In such cases, the conventional image-processing apparatus may introduce certain undesired artifacts called staircase artifacts into the one or more regions.

Staircase artifacts are common artifacts which may be observed in many de-noising tasks, such as one-dimensional signal de-noising, two-dimensional image de-noising, and video de-noising. Existing image de-noising technologies may flatten one or more regions of an image signal, and thereby create staircase artifacts in the image signal. Consequently, the staircase artifacts may manifest in the one or more regions of the image signal, as undesired false steps or undesired flat regions in an otherwise smoothly varying image signal. In the captured image, the staircase artifacts may manifest as undesired discrepancies such as a presence of staircase like lines or boundaries, a loss of detail, and contouring.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An image-processing apparatus to reduce staircase artifacts from an image signal substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
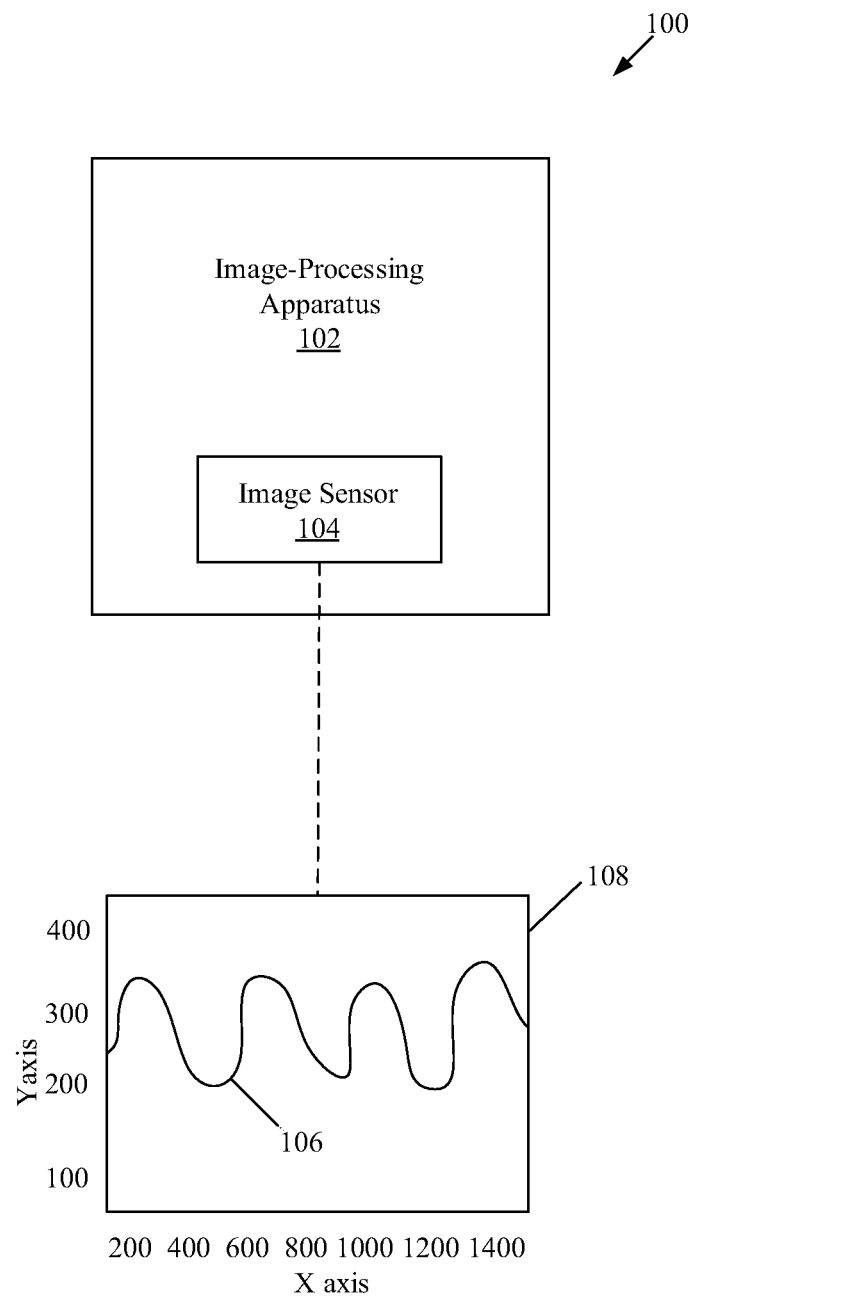
FIG. 1 illustrates an exemplary environment for an image-processing apparatus to reduce staircase artifacts from an image signal, in accordance with an embodiment of the disclosure.

The following described implementations may be found in the disclosed image-processing apparatus to reduce staircase artifacts. Exemplary aspects of the disclosure may include an image-processing apparatus comprising an image sensor and a circuitry. The image sensor may be configured to capture an input image signal. The circuitry may be configured to identify a first portion of the input image signal that exhibits a staircase artifact. The circuitry may be further configured to generate a slope signal based on a steepness parameter of a slope that corresponds to the first portion. The slope signal may be generated based on the identification. The circuitry may be configured to generate a difference signal based on a difference between the first portion of the input image signal and the generated slope signal. Further, the circuitry may be configured to generate a de-noised image signal based on the generated difference signal and the generated slope signal to reduce the staircase artifact in the first portion of the input image signal.

In accordance with an embodiment, the circuitry may be configured to classify a plurality of portions of the input image signal that exhibits the staircase artifact and that may be free of the staircase artifact, based on the identification of one or more region-of-interests that exhibits the staircase artifact. The one or more region-of-interests may include a first region-of-interest that corresponds to the identified first portion that exhibits the staircase artifact. The circuitry may be configured to segregate one or more portions of the plurality of portions of the input image signal that exhibits the staircase artifact, to be processed in a first processing pipeline. The circuitry may be configured to segregate remaining one or more portions of the plurality of portions that are free of the staircase artifact to be processed in a second processing pipeline. The second processing pipeline may be different from the first processing pipeline. The segregation may be done based on the classification of the plurality of portions of the input image signal.

In accordance with an embodiment, the circuitry may be configured to acquire sample values from the first portion of the input image signal for the identification of the first portion that exhibits the staircase artifact. The circuitry may be configured to generate a first set of horizontal gradient values and a first set of vertical gradient values based on the acquired sequence of sample values of the first portion of the input image signal.

In accordance with an embodiment, the circuitry may be configured to compute the steepness parameter based on a first computed mean of the first set of vertical gradient values and a second computed mean of the first set of horizontal gradient values. The first portion of the input image signal corresponds to a first image patch of an image captured by the image sensor. The circuitry may be configured to compute a difference between each pair of adjacent pixel values for each row of the first image patch to generate the first set of horizontal gradient values. The circuitry may be configured to compute a difference between each pair of adjacent pixel values for each column of the first image patch to generate the first set of vertical gradient values. The identification of the first portion that exhibits the staircase artifact may be based on a defined set of criteria.

In accordance with an embodiment, the circuitry may be configured to determine that a mean value of a set of pixel values of the first image patch may be within a defined mid-gray range. The mean value is determined as first criteria of the defined set of criteria. As second criteria of the defined set of criteria, the circuitry may be configured to determine that a difference between a first horizontal gradient value and a second horizontal gradient value of the first set of horizontal gradient values, may be less than a defined limit. The circuitry is further configured to determine, as third criteria of the defined set of criteria, whether a difference between a first vertical gradient value and a second vertical gradient value of the first set of vertical gradient values, may be less than a defined limit. The circuitry may be further configured to determine, as fourth criteria of the defined set of criteria, the steepness parameter of the slope that may be less than a threshold based on the first set of horizontal gradient values and the first set of vertical gradient values.

FIG. 1 illustrates an image-processing apparatus to reduce staircase artifacts, in accordance with an embodiment of the disclosure. With reference to FIG. 1, there is shown an image-processing apparatus 102. The image-processing apparatus 102 may be communicatively coupled with an image sensor 104. The image sensor 104 may capture an input image signal 106, as illustrated in a first graph 108. The input image signal 106 may include pixel values of various pixels in a first image. An "X" axis of the first graph 108 may indicate a pixel position. The "Y" axis of the first graph 108 may indicate pixel value of a pixel in the respective pixel position. The input image signal 106 may include a plurality of portions. One or more portions of the plurality of portions of the input image signal 106 may have slowly varying color or luminosity. Such portions among the plurality of portions of the input image signal 106, may exhibit staircase artifacts. In accordance with an embodiment, the input image signal 106 may be a one-dimensional signal. In other embodiments, the input image signal 106 may be a two-dimensional image signal. The input image signal 106 has been represented as a one-dimensional signal in FIG. 1 for illustrative purposes. Various functionalities and operations of the image-processing apparatus 102, which have been illustrated (in FIG. 1) are applicable for both one-dimensional signal and the two-dimensional image signal.

The image-processing apparatus 102 may comprise suitable circuitry, interfaces, and/or code that may be configured process the input image signal 106 received from the image sensor 104. The image-processing apparatus 102 may be configured to process the input image signal 106 to identify one or more portions of the input image signal 106 which may exhibit staircase artifacts. Examples of the image-processing apparatus 102 may include, but are not limited to a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player). Other examples of the image-processing apparatus 102 may include, but are not limited to a television, a home entertainment system, an augmented reality device, a virtual reality device, smart jewelry (e.g., smart watch) or any other suitable computing device.

The image sensor 104 may comprise suitable logic, circuitry, interfaces, and/or code that may be configured to capture the input image signal 106 from a field-of-view of the image sensor 104. The input image signal 106 may be a one-dimensional image signal, a two-dimensional image signal, or a video signal. The image sensor 104 may have suitable optical instruments such as focusing lenses which may focus the particular scene and/or particular object on the image sensor 104. Examples of implementation of the image sensor 104 may include but is not limited to a semiconductor charged coupled device (CCD) based image sensor, a Complementary metal-oxide-semiconductor (CMOS) based image sensor 104, N-type metal-oxide-semiconductor based image sensor, or other image sensors.

In operation, the image sensor 104 may be configured to capture the input image signal 106 from a field-of-view of the image sensor 104. In some cases, a user of the image-processing apparatus 102 may point the image sensor 104 towards a particular scene to capture the input image signal 106 of a particular scene. In one example, the particular scene may be insufficiently illuminated and may include several low light regions. In another example, the image sensor 104 may be pointed to a particular object which may be insufficiently illuminated. In such cases, the input image signal 106 may include one or more portions that may have a low signal-to-noise ratio (SNR). The one or more portions with the low SNR may exhibit the staircase artifacts.

The image-processing apparatus 102 may be configured to process the input image signal 106 to identify one or more portions of the input image signal 106 which may exhibit staircase artifacts. The image-processing apparatus 102 may be configured to identify the portion(s) of the input image signal 106, which exhibits the staircase artifacts and the portion(s) that do not exhibit the staircase artifacts. The image-processing apparatus 102 may be configured to determine whether a first portion of a plurality of portions of the input image signal 106 exhibits a staircase artifact or not. In order to identify whether the first portion exhibits the staircase artifact, the image-processing apparatus 102 may be configured to acquire a sequence of sample values (for example, pixel values) from the first portion of the input image signal 106. Further, the image-processing apparatus 102 may be configured to identify whether the acquired sequence of sample values satisfies a defined set of criteria. In the case where the acquired sample values satisfy the defined set of criteria, the image-processing apparatus 102 may be configured to identify that the first portion of the input image signal 106 may exhibit the staircase artifact if the first portion is de-noised with a plurality of known image de-noising operations.

In some cases, the input image signal 106 may be a one-dimensional (1D) image signal. As first criteria of the defined set of criteria, the image-processing apparatus 102 may be configured to detect that the sequence of sample values are within a defined mid-grey range. The image-processing apparatus 102 may be configured to detect whether a computed mean of the sequence of sample values lie within the defined mid-grey range. In the case where a plurality of pixel values in the input image signal 106 range between "0" to "255", then the defined mid-grey range may be between the arithmetic numbers "92" and "198". In cases where the computed mean is within the defined mid-grey range, the image-processing apparatus 102 may be configured to detect that the input image signal 106 satisfies the first criteria of the defined set of criteria.

As second criteria of the defined set of criteria, the image-processing apparatus 102 may be configured to detect whether the first portion of the input image signal 106 varies (e.g., increases or decreases) at a consistent rate. Consistency of the rate with which the input image signal 106 may vary, may be determined from gradient values between each pair of adjacent sample values in the sequence of sample values. Therefore, the image-processing apparatus 102 may be configured to compute a set of gradient values associated with the input image signal 106. The set of gradient values may include differences between each pair of adjacent sample values in the sequence of sample values. In certain scenarios, a difference between one of the largest gradient value and one of the lowest gradient value in the set of gradient values may indicate consistency with which the input image signal 106 varies. For example, the image-processing apparatus 102 may be configured to compute a difference between a second highest gradient value and a second lowest gradient value in the set of gradient values. Further, the image-processing apparatus 102 may be configured to detect whether the computed difference may be lesser than a defined limit (for example, 8), to determine whether the input image signal 106 varies consistently. In the case where the computed difference is lesser than the defined limit, the image-processing apparatus 102 may be configured to detect that the first portion of the input image signal 106 satisfies the second criteria. The image-processing apparatus 102 may be configured to determine whether gradient values of the set of gradient values are positive gradient values, or negative gradient values.

As other criteria in the defined set of criteria, the image-processing apparatus 102 may be configured to detect whether the input image signal 106 varies (increases or decreases) at a rate which may be greater than a threshold rate. The rate at which the input image signal 106 varies may be determined from the set of gradient values. Therefore, the image-processing apparatus 102 may be configured to compare one or more gradient values in the set of gradient values with one or more limits or thresholds.

In cases where the set of gradient values are positive gradient values, the image-processing apparatus 102 may be configured to detect whether the second lowest gradient value in the set of gradient values is greater than a positive threshold value (for example, 6). In cases where the second lowest gradient value is greater than the positive threshold value, the image-processing apparatus 102 may detect the respective criteria to be satisfied.

In cases where the set of gradient values are negative gradient values, the image-processing apparatus 102 may be configured to detect whether the second highest gradient value in the set of gradient values is lesser than a negative threshold value (for example, −6). In cases where the second highest gradient value is less than the negative threshold value, the image-processing apparatus 102 may detect that the input image signal 106 satisfies the respective criteria.

In cases where the sequence of sample values satisfies the defined set of criteria, the image-processing apparatus 102 may be configured to identify that the first portion exhibits the staircase artifact. In cases where the sequence of sample values fails to satisfy the defined set of criteria, the image-processing apparatus 102 may be configured to identify that the first portion may be free of the staircase artifact. In a case where the first portion exhibits the staircase artifact, the image-processing apparatus 102 may be configured to compute a steepness parameter for the first portion of the input image signal 106. The steepness parameter of the first portion of the input image signal 106 may indicate an average rate of variation of the input image signal 106. In certain scenarios, the steepness parameter may be equal to an average of gradient values in the set of gradient values. Therefore, the image-processing apparatus 102 may be configured to compute a mean of the set of gradient values, to determine the steepness parameter of the first portion of the input image signal 106. The steepness parameter may indicate a slope that corresponds to the first portion of the input image signal 106.

In accordance with an embodiment, the image-processing apparatus 102 may be configured to generate the slope signal based on the steepness parameter of the slope. The image-processing apparatus 102 may be configured to generate the slope signal such that a rate of variation (increase or decrease) of the slope signal may be equal to the steepness parameter. The image-processing apparatus 102 may be configured to compute a difference between the first portion of the input image signal 106 and the generated slope signal. In one example, the image-processing apparatus 102 may be configured to subtract the generated slope signal from the first portion of the input image signal 106 to generate the difference signal.

In accordance with an embodiment, the image-processing apparatus 102 may be configured to filter the generated difference signal, by use of an image de-noising filters. Examples of the de-noising filter may include, but is not limited to a spatial linear filter, a median filter, an adaptive median filter, and other non-linear filters. The image-processing apparatus 102 may be configured to de-noise the generated difference signal to generate a de-noised difference signal. In certain scenarios, the image-processing apparatus 102 may be configured to generate a de-noised image signal based on the generated difference signal and the generated slope signal, to reduce the staircase artifact in the first portion of the input image signal 106. In certain scenarios, the image-processing apparatus 102 may be configured to compute a sum of the generated difference signal and the generated slope signal to generate the de-noised image signal. In some examples, the input image signal 106 may be processed as the two-dimensional image signal. Identification of the first portion of the two-dimensional image signal as one that may exhibit the staircase artifact, is explained in detail, for example in FIG. 3.

Figure 2:
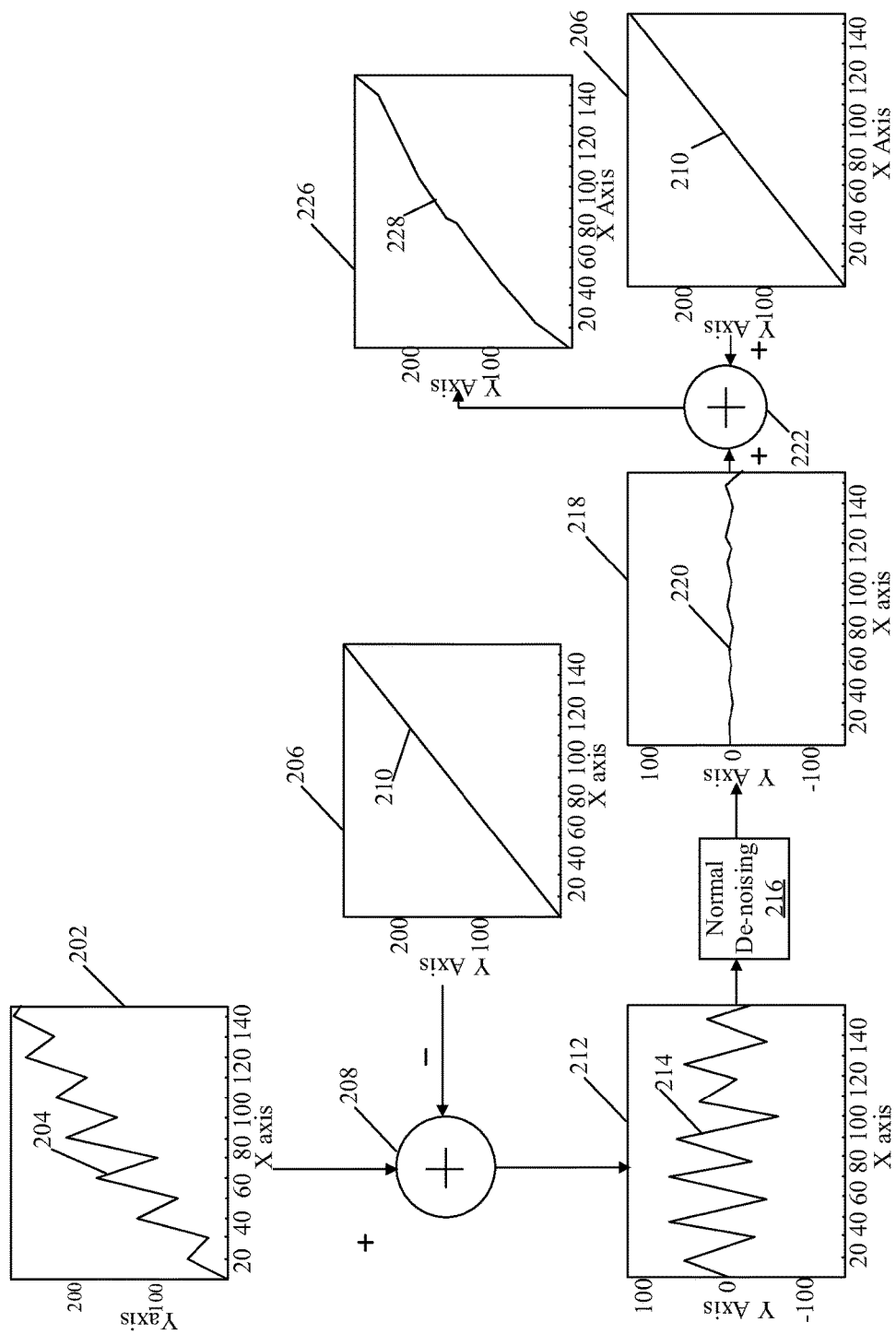
FIG. 2 illustrates exemplary operations of the image-processing apparatus of FIG. 1 for reduction of staircase artifacts from an image signal, in accordance with an embodiment of the disclosure.

FIG. 2 illustrates exemplary operations of the image-processing apparatus 102 of FIG. 1 for reduction of staircase artifacts from an image signal, in accordance with an embodiment of the disclosure. FIG. 2 illustrates exemplary operations of the image-processing apparatus 102 of FIG. 1 for reduction of staircase artifacts from an image signal, in accordance with an embodiment of the disclosure. FIG. 2 is explained in conjunction with elements from FIG. 1. The input image signal 106 has been represented as a one-dimensional signal in FIG. 2 for illustrative purposes. Various functionalities and operations of the image-processing apparatus 102, which have been illustrated (in FIG. 2) to be applicable on the one-dimensional signal, may be applicable on the two-dimensional image signal as well.

At 202, a first portion 204 of the input image signal may be processed by the image-processing apparatus 102. The image-processing apparatus 102 may be configured to identify that the first portion 204 may exhibit the staircase artifact. Further, the image-processing apparatus 102 may be configured to compute the steepness parameter of the first portion 204 of the input image signal 106, as discussed, for example, in FIG. 1.

At 206, a slope signal 210 may be generated by the image-processing apparatus 102, based on the computed steepness parameter. The generated slope signal 210 may increase or decrease at a rate that corresponds to the computed steepness parameter.

At 208, the generated slope signal 210 may be subtracted from the first portion 204 of the input image signal 106. The image processing apparatus 102 may be configured to subtract the generated slope signal 210 from the first portion 204 of the input image signal 106.

At 212, a difference signal 214 may be generated by the image-processing apparatus 102 based on the computed difference between the generated slope signal 210 and the first portion 204 (represented by the first graph component 204) of the input image signal 106. The image-processing apparatus 102 may be configured to generate the difference signal 214 by subtracting the generated slope signal 210 from the first portion 204 (represented by the first graph component 204) of the input image signal 106.

At 216, the generated difference signal 214 may be de-noised. The image-processing apparatus 102 may be configured to de-noise the generated difference signal 214, by use of the de-noising filters, as discussed in FIG. 1.

At 218, a de-noised difference signal 220 may be generated based on the generated difference signal 214. The image-processing apparatus 102 may be configured to generate the de-noised difference signal 220 by use of the de-noising filters.

At 222, a sum of the generated de-noised difference signal 220 and the generated slope signal 210 may be computed by the image-processing apparatus 102. At 226, a de-noised image signal 228 may be generated by the image-processing apparatus 102 based on the generated de-noised difference signal 220 and the generated slope signal 210.

Figure 3:
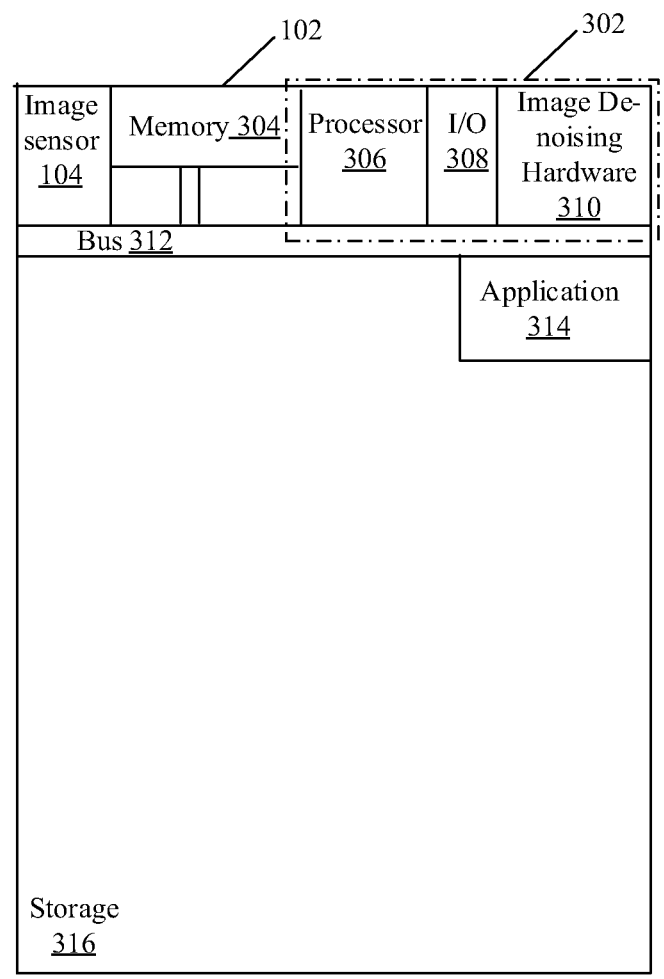
FIG. 3 illustrates an exemplary image-processing apparatus, in accordance with an embodiment of the disclosure.

FIG. 3 is a block diagram that illustrates an exemplary image-processing apparatus to reduce staircase artifacts from an image signal, in accordance with an embodiment of the disclosure. FIG. 3 is explained in conjunction with elements from FIG. 1. With reference to FIG. 3, there is shown an image-processing apparatus 102.

The image-processing apparatus 102 may comprise suitable logic, circuitry, interfaces, and/or code that may be configured to capture, store, process, and/or communicate image signals. In general, a hardware structure suitable for implementing the image-processing apparatus 102 includes circuitry 302, the image sensor 104, and a memory 304. The circuitry 302 may include a processor 306, Input-Output (I/O) devices 308, and an image de-noising hardware 310 (shown as HW 310). The image-processing apparatus 102 may further include a bus 312, an image de-noising application 314, and a storage device 316. The memory 304, the processor 306, I/O device(s) 308, the image de-noising hardware 310, and the storage device 316 may be communicatively coupled to each other, via the bus 312. The circuitry 302 may be configured to perform a plurality of image de-noising operations to process the input image signal 106 and to reduce staircase artifacts in the captured input image signal 106. The circuitry 302 may perform the plurality of image-denoising operations by using the processor 306, the image de-noising hardware 310 and/or the image de-noising application 314. A combination of the processor 306, and the image de-noising hardware 310 may be configured to perform the plurality of image de-noising operations which are executable by the circuitry 302.

The image sensor 104 may comprise suitable logic, circuitry, interfaces, and/or code that may be configured to capture the input image signal 106 from a field-of-view of the image sensor 104. The input image signal 106 may be processed by the image-processing apparatus 102 as a one-dimensional signal, a two-dimensional image signal, or a video signal. The input image signal 106 may include a video or an image of a particular scene and/or a particular object present in the field-of-view of the image sensor 104. The image sensor 104 may have suitable optical instruments such as focusing lenses which may focus the particular scene and/or particular object on the image sensor 104. Examples of implementation of the image sensor 104 may include but is not limited to a semiconductor charged coupled device (CCD) based image sensor, a Complementary metal-oxide-semiconductor (CMOS) based image sensor, and an N-type metal-oxide-semiconductor based image sensor.

The memory 304 may comprise suitable logic, circuitry, and/or interfaces that may be configured to store a machine code and/or a set of instructions executable by the processor 306. The memory 304 may be further configured to store the input image signal 106 received from the image sensor 104. The memory 304 may be configured to store the machine code and/or the set of instructions which may correspond to one or more image de-noising filters. Examples of implementation of the memory 304 may include, but not limited to, Random Access Memory (RAM), Read Only Memory (ROM), Hard Disk Drive (HDD), a Secure Digital (SD) card, and/or other Solid-State Device (SSD). The memory 304 may be any conventional computer memory known in the art.

The processor 306 may comprise suitable logic, circuitry, interfaces, and/or code that may be configured to execute a set of instructions stored in the memory 304. In one example, the input image signal 106 captured by the image sensor 104 may be processed by the processor 306 as a two-dimensional image signal. The choice of processor is not critical as long as a suitable processor with sufficient speed is chosen. Examples of implementation of the processor 306 may be an X86-based processor, a Reduced Instruction Set Computing (RISC) processor, an Application-Specific Integrated Circuit (ASIC) processor, a Complex Instruction Set Computing (CISC) processor, and/or other processors.

The I/O devices 308 may comprise suitable logic, circuitry, interfaces, and/or code that may be configured to receive one or more inputs from a user of the image-processing apparatus 102 and to display information to the user. Examples of implementation of the I/O devices 308 may keyboard, mouse, monitor, screen, printer, modem, touchscreen, button interface, and other devices.

The image de-noising hardware 310 may comprise suitable logic, circuitry, and/or interfaces which may be configured to de-noise the input image signal 106. In one example, the image de-noising hardware 310 may include one or more circuits to process signals such as the input image signal 106.

The image de-noising application 314 may be installed in the storage 316, which may be configured to de-noise the input image signal 106 captured by the image sensor 104 and reduce staircase artifacts. In accordance with an embodiment, the image de-noising application 314 may include software component installed in the storage 316. In accordance with an embodiment, the functionalities of the image de-noising application 314 may be implemented as a part of the processor 306.

The storage 316 may comprise suitable logic, circuitry 302, and/or interfaces that may be configured to store a plurality of image de-noising algorithms. The storage 316 may be further configured to store the input image signal 106 received from the image sensor 104. Examples of implementation of the storage 316 may include, but not limited to, Random Access Memory (RAM), Read Only Memory (ROM), Hard Disk Drive (HDD), a Secure Digital (SD) card, other Solid State Device (SSD), Compact Disc Read Only Memory (CDROM), Compact Disc Readable Writeable (CDRW), Digital Versatile Disc (DVD), Digital Versatile Disc Readable Writeable (DVDRW), Blu-ray drive, flash memory card, or any other storage device.

In operation, the I/O devices 308 may receive the input image signal 106 from the image sensor 104. In accordance with an embodiment, the processor 306 may be configured to process the input image signal 106 as a two-dimensional image signal. The two-dimensional image signal may include an image captured by the image sensor 104. The captured image may include a plurality of pixels and a plurality of pixel values associated with the plurality of pixels. In such a case, the first portion of the input image signal 106 may correspond to a first image patch of the captured image.

The circuitry 302 may be configured to acquire a sequence of sample values from the first portion of the input image signal 106. The acquired sequence of sample values may correspond to pixel values of a set of pixels in the first image patch. The set of pixels may be arranged in the first image-patch in a plurality of rows and a plurality of columns. In one example, the image-processing apparatus 102 may be configured to down-sample the set of pixels in the first image patch into a down-sampled set of pixels. Down-sampling of the set of pixels is described in detail, for example, in FIG. 4A.

Figure 4A:
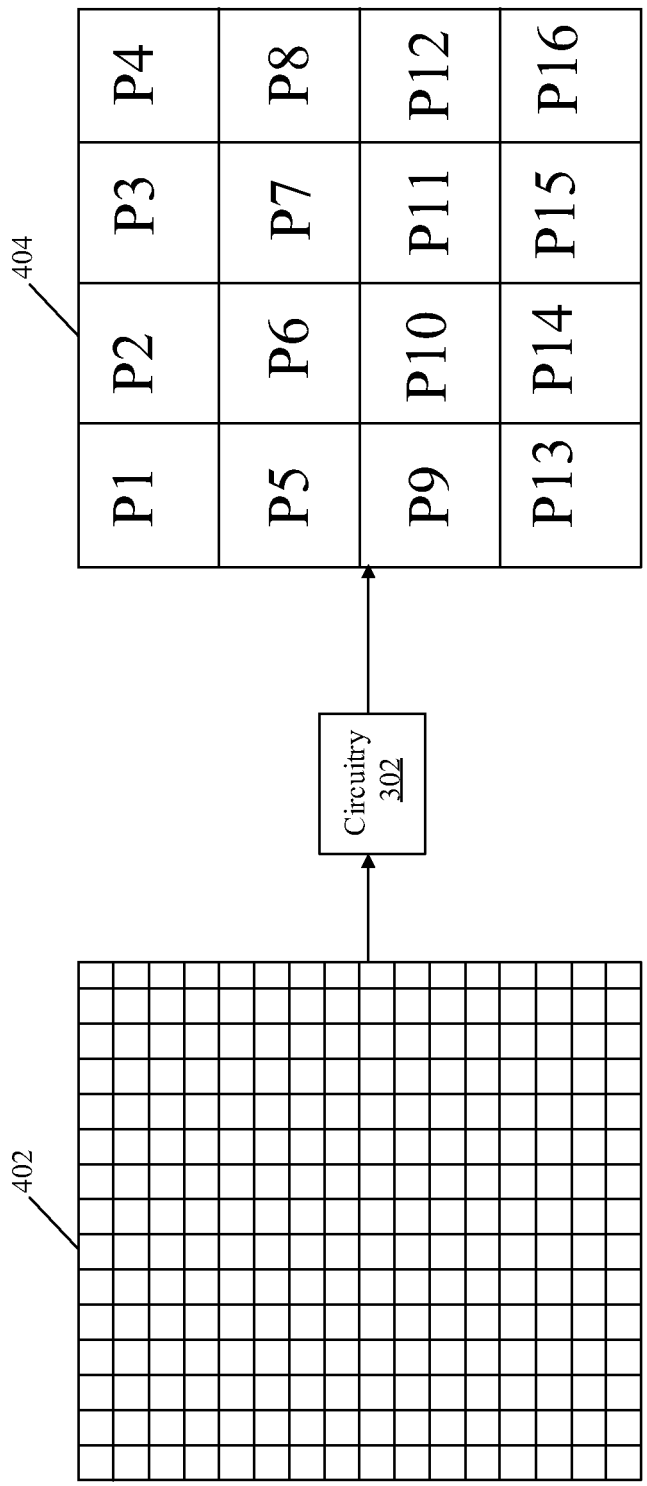
FIGS. 4A to 4C collectively, illustrate exemplary operations to reduce staircase artifacts from an image signal, in accordance with an embodiment of the disclosure.
Figure 4B:
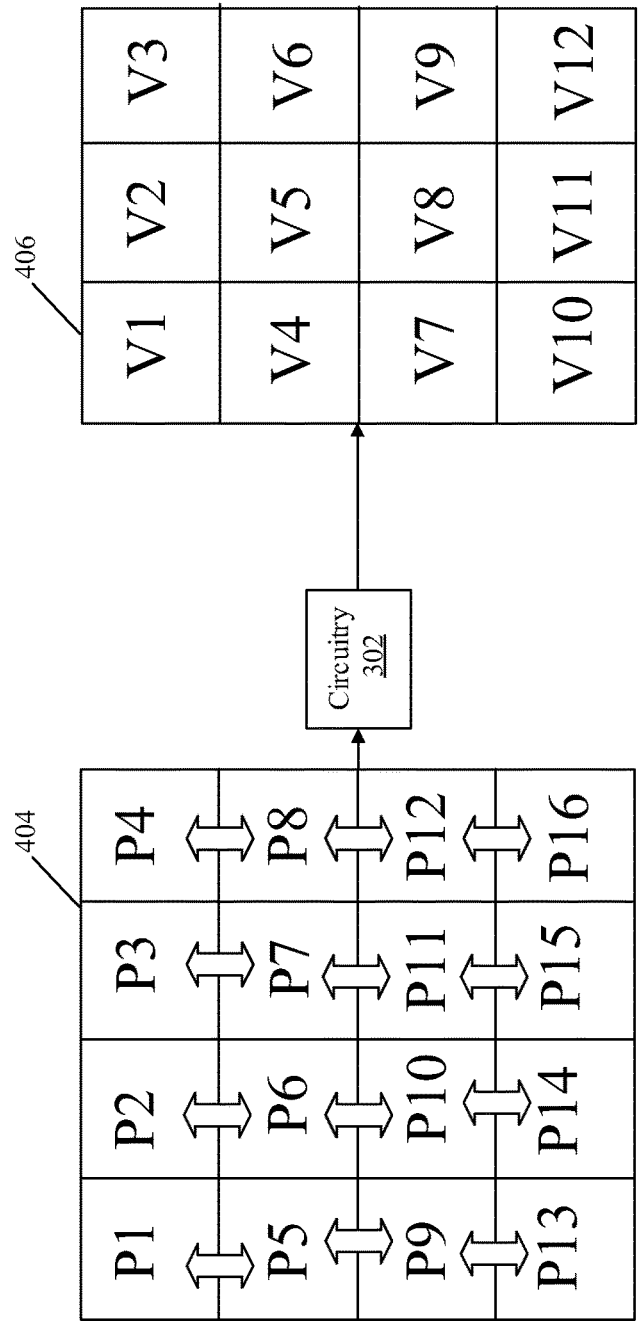
Figure 4C:
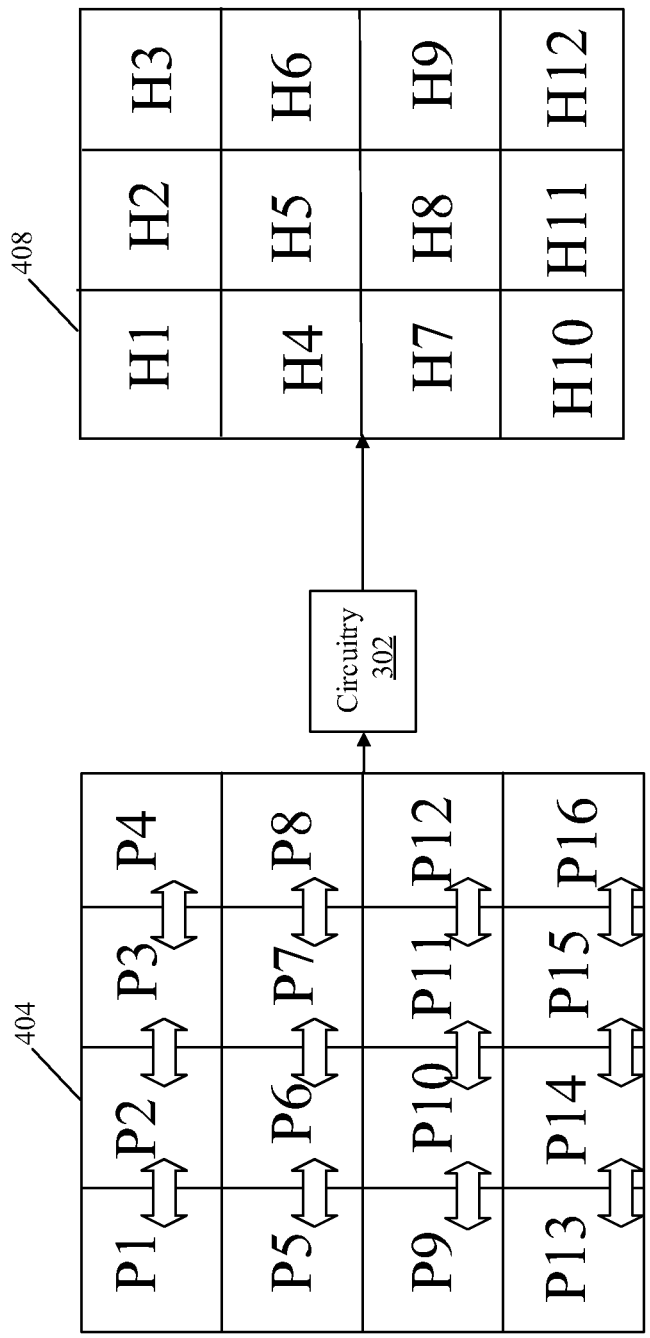

FIGS. 4A to 4C collectively, illustrate exemplary operations to reduce staircase artifacts from an image signal, in accordance with an embodiment of the disclosure. Referring to FIG. 4A, there is shown a first set of pixels 402 comprising 256 pixels. The circuitry 302 may be configured to down-sample the first set of pixels to a second set of pixels comprising 16 pixels.

In one example, a set of pixel values of the second set of pixels, may be represented as a first matrix 404 comprising four rows and four columns. A first row of the first matrix may comprise pixel values P1, P2, P3, and P4 respectively. A second row of the first matrix 404 may include pixel values P5, P6, P7, and P8 respectively. A third row of the first matrix 404 may include pixel values P9, P10, P11, and P12 respectively. A fourth row of the first matrix may include pixel values P13, P14, P15, and P16 respectively. Similarly, a first column of the first matrix 404 may include pixel values P1, P5, P9, and P13 respectively. A second column of the first matrix 404 may include pixel values P2, P6, P10, and P14 respectively. A third column of the first matrix 404 may include pixel values P3, P7, P11, and P15 respectively. A fourth column of the first matrix 404 may include pixel values P4, P8, P12, and P16 respectively.

The circuitry 302 may be further configured to generate a first set of horizontal gradient values and a first set of vertical gradient values based on the acquired sequence of sample values. To generate the first set of horizontal gradient values, the circuitry 302 may be configured to compute a difference between each pair of adjacent pixel values for each row of the first image patch. To generate the first set of vertical gradient values, the circuitry 302 may be configured to compute a difference between each pair of adjacent pixel values for each column of the first image patch.

Generation of the first set of vertical gradient values is described in detail, for example, in FIG. 4B. Referring to FIG. 4B, there is shown the first matrix 404 comprising the set of pixel values associated with the second set of pixels. The circuitry 302 may be configured to calculate the first set of vertical gradient values from the first matrix 404. The first set of vertical gradient values may be represented as a second matrix 406 comprising four rows. A first row of the second matrix 406 may include vertical gradient values V1, V2, and V3 respectively. A second row of the second matrix 406 may include vertical gradient values V4, V5, and V6 respectively. A third row of the second matrix 406 may include vertical gradient values V7, V8, and V9 respectively. A fourth row of the second matrix 406 may include vertical gradient values V10, V11, and V12 respectively. In one example, vertical gradient values in the first row of the second matrix 406 may be computed from pixel values in the first column of the first matrix 404. For example, V1 may be a first difference between P1 and P5. V2 may be a second difference between P5 and P9. V3 may be a third difference between P9 and P13. Similarly, pixel values P2, P6, P10, and P14, may be used by the circuitry 302 to compute vertical gradient values V4, V5, and V6. Pixel values P3, P7, P11, and P15, may be used by the circuitry 302 to compute vertical gradient values V7, V8, and V9. Pixel values P4, P8, P12, and P16, may be used by the circuitry 302 to compute vertical gradient values V10, V11, and V12 respectively.

Generation of the first set of horizontal gradient values is described in detail, for example, in FIG. 4C. Referring to FIG. 4C, there is shown the first matrix 404 comprising the set of pixel values of the second set of pixels. The circuitry 302 may be configured to calculate the first set of horizontal gradient values from the first matrix 404. The first set of horizontal gradient values may be represented as a third matrix 408 comprising four rows. A first row of the third matrix 408 may include horizontal gradient values H1, H2, and H3 respectively. A second row of the third matrix 408 may include horizontal gradient values H4, H5, and H6 respectively. A third row of the third matrix 408 may include horizontal gradient values H7, H8, and H9 respectively. A fourth row of the third matrix 408 may include horizontal gradient values H10, H11, and H12 respectively. To generate the first set of horizontal gradient values, the circuitry 302 may be configured to compute a difference between each pair of adjacent pixel values for each row of the first image patch. Horizontal gradient values in the first row of the third matrix 408 may be computed from pixel values in the first row of the first matrix 404. For example, H1 may be computed from a first difference between P1 and P2. H2 may be computed from a second difference between P2 and P3. H3 may be a third difference between P3 and P4. Similarly, pixel values P5, P6, P7, and P8, may be used by the circuitry 302 to compute horizontal gradient values H4, H5, and H6. Pixel values P9, P10, P11, and P12, may be used by the circuitry 302 to compute horizontal gradient values H7, H8, and H9. Pixel values P13, P14, P15, and P16, may be used by the circuitry 302 to compute horizontal gradient values H10, H11, and H12 respectively.

The circuitry 302 may be configured to detect whether the set of pixel values of the first image patch, satisfy the defined set of criteria. In accordance with an embodiment, the defined set of criteria may include first criteria, second criteria, third criteria, and fourth criteria. The circuitry 302 may be configured to compute a mean value of the set of pixel values. As the first criteria, the circuitry 302 may be configured to determine whether the computed mean value of the set of pixel values of the first image patch, may be within a defined mid-gray range. In cases where the set of pixel values of the first image patch range from "0" to "255", the defined mid-gray range may be a range of numbers spanning from 64 to 192. In such a case, the image-processing apparatus 102 may be configured to detect whether the computed mean may be greater than 64 and lesser than 192. In cases where the computed mean may be within the defined mid-grey range, the circuitry 302 may be configured to detect that the set of pixel values of the first image-patch satisfies the first criteria.

In accordance with an embodiment, as the second criteria and the third criteria, the image-processing apparatus 102 may be configured to detect whether a spatial consistency of the set of pixel values may be within a defined or particular limit or threshold. The spatial consistency may correspond to spatial consistency of luminosity of pixels associated with the set of pixel values. The spatial consistency may be determined from one or more gradient values in the first set of horizontal gradient values and the first set of vertical gradient values.

For example, the circuitry 302 may be configured to select a first horizontal gradient value and a second horizontal gradient from the first set of horizontal gradient values. In one example, the first horizontal gradient value may be a second largest horizontal gradient value of the first set of horizontal gradient values. In another example, the first horizontal gradient value may be a third largest horizontal gradient value of the first set of horizontal gradient values. Similarly, the second horizontal gradient value may be a second lowest horizontal gradient value of the first set of horizontal gradient values. In another example, the second horizontal gradient value may be a third lowest horizontal gradient value of the first set of horizontal gradient values.

In certain scenarios, a difference between the first horizontal gradient value and the second horizontal gradient value may indicate the spatial consistency of the set of pixels. Therefore, the circuitry 302 may be configured to calculate the difference between the first horizontal gradient value and the second horizontal gradient value to determine spatial consistency of the set of pixels. In such scenarios, the circuitry 302 may be configured to detect whether the determined spatial consistency of the set of pixels may be less than a defined limit (for example, 8). In the case where the spatial consistency may be lesser than the defined limit, the image-processing apparatus 102 may be configured to detect whether the first image-patch of the captured image satisfies the second criteria in the defined set of criteria.

In certain scenarios, the circuitry 302 may be configured to select a first vertical gradient value and a second vertical gradient value from the first set of vertical gradient values. The first vertical gradient value may be a second largest vertical gradient value of the first set of vertical gradient values. In another example, the first vertical gradient value may be a third largest vertical gradient value of the first set of vertical gradient values. Similarly, the second vertical gradient value may be a second lowest vertical gradient value of the first set of vertical gradient values. In another example, the second vertical gradient value may be a third lowest vertical gradient value of the first set of vertical gradient values.

In certain scenarios, the spatial consistency of the set of pixels may be equal to a difference between the first vertical gradient value and the second vertical gradient value. Therefore, the circuitry 302 may be configured to calculate the difference between the first vertical gradient value and the second vertical gradient value. In such scenarios, image-processing apparatus 102 may be configured to detect whether the determined spatial consistency of the set of pixels may be less than the defined limit (for example, a pixel value 8). In the case where the spatial consistency is less than the defined limit, the image-processing apparatus 102 may be configured to detect that the first image patch of the captured image satisfies the third criteria in the defined set of criteria.

In accordance with an embodiment, the circuitry 302 may be configured to identify the first vertical gradient, the second vertical gradient, the first horizontal gradient, and the second horizontal gradient. as one of a positive gradient and a negative gradient. The image-processing apparatus 102, as a fourth criteria of the defined set of criteria, may be configured to detect whether a steepness parameter of the first portion the input image signal 106 may be greater than a defined threshold. The steepness parameter may indicate a rate at which the input image signal 106 varies (increases or decreases). In one example, the steepness parameter of the input image signal 106 may correspond to one of the first vertical gradient value (i.e. the second largest or third largest vertical gradient value), the second vertical gradient value (i.e. the second lowest or third lowest vertical gradient value), the first horizontal gradient value (i.e. the second largest or third largest horizontal gradient value), and the second horizontal gradient value (i.e. the second lowest or third lowest horizontal gradient value).

In cases where the first vertical gradient, the second vertical gradient, the first horizontal gradient, and the second horizontal gradient, are positive gradients, the circuitry 302 may be configured to detect whether the second vertical gradient value (i.e. the second lowest or third lowest vertical gradient value) or the second horizontal gradient value (i.e. the second lowest or third lowest horizontal gradient value) may be greater than a defined positive threshold (for example, 6). In cases where the second vertical gradient value or the second horizontal gradient value may be greater than the defined positive threshold, the circuitry 302 may be configured to detect that the first image patch of the captured image satisfies the fourth criteria. Alternatively stated, the circuitry 302 may be configured to detect whether an absolute value of the second vertical gradient value or the second horizontal gradient value may be greater than the defined positive threshold (for example, 6). In cases where the second vertical gradient value or the second horizontal gradient value may be greater than the defined positive threshold, the circuitry 302 may be configured to detect that the steepness parameter is greater than the defined threshold. In such cases, the first image patch of the captured image satisfies the fourth criteria.

In other cases where the first vertical gradient, the second vertical gradient, the first horizontal gradient, and the second horizontal gradient, are negative gradients, the circuitry 302 may be configured to detect whether the first vertical gradient value (i.e. the second largest or third largest vertical gradient value) or the first horizontal gradient value (i.e. the second largest or third largest horizontal gradient value) may be lesser than a defined negative threshold (for example, −6). In cases where the first vertical gradient value or the first horizontal gradient value may be less than the defined negative threshold, the circuitry 302 may be configured to detect that the first image patch of the captured image satisfies the fourth criteria. Alternatively stated, the circuitry 302 may be configured to detect whether an absolute value of the first vertical gradient value or the first horizontal gradient value may be greater than the defined positive threshold (for example, 6). In cases where the first vertical gradient value or the first horizontal gradient value may be greater than the defined positive threshold, the circuitry 302 may be configured to detect that the steepness parameter is greater than the defined threshold. In such cases, the first image patch of the captured image satisfies the fourth criteria.

In certain scenarios, the steepness parameter may correspond to a computed mean of one of the first set of vertical gradient and the first set of horizontal gradient values. The circuitry 302 may be configured to compute the steepness parameter based on a first computed mean of the first set of vertical gradient values and a second computed mean of the first set of horizontal gradient values.

In cases where the first portion of the input image signal 106 satisfies the defined set of criteria, the circuitry 302 may be configured to identify the first portion to exhibit the staircase artifact. In certain scenarios, the circuitry 302 may be configured to determine if the first portion to may exhibit the staircase artifact, based on the identification. In cases where the first portion fails to meet at least one of the set of defined criteria, the image-processing apparatus 102 may be configured to identify the first portion to be free of the staircase artifact.

In accordance with an embodiment, the circuitry 302 may be configured to classify the first portion into one of a first set of portions and a second set of portions. The first set of portions may exhibit the staircase artifact. The second set of portions that may be free of the staircase artifact (i.e. without staircase artifact). Similarly, the image-processing apparatus 102 may be configured to classify a plurality of portions of the input image signal 106 into one of the first set of portions that exhibits the staircase artifact, and the second set of portions that may be free of the staircase artifact, based on the identification. The image-processing apparatus 102 may be configured to identify one or more region-of-interests (in the plurality of portions) that exhibits the staircase artifact. The one or more region-of-interests may include a first region-of-interest that corresponds to the identified first portion that may exhibits the staircase artifact.

In accordance with an embodiment, the image-processing apparatus 102 may be configured to segregate one or more portions (such as the first set of portions) of the plurality of portions of the input image signal 106 that exhibits the staircase artifact, to be processed in a first processing pipeline. Further, the image-processing apparatus 102 may be configured to segregate remaining one or more portions (such as the second set of portions) of the plurality of portions that may be free of the staircase artifact, to be processed in a second processing pipeline. The first processing pipeline, may be different from the second processing pipeline. The segregation of the plurality of portions into the first processing pipeline and the second processing pipeline has been explained in detail, for example, in FIG. 5.

Figure 5:
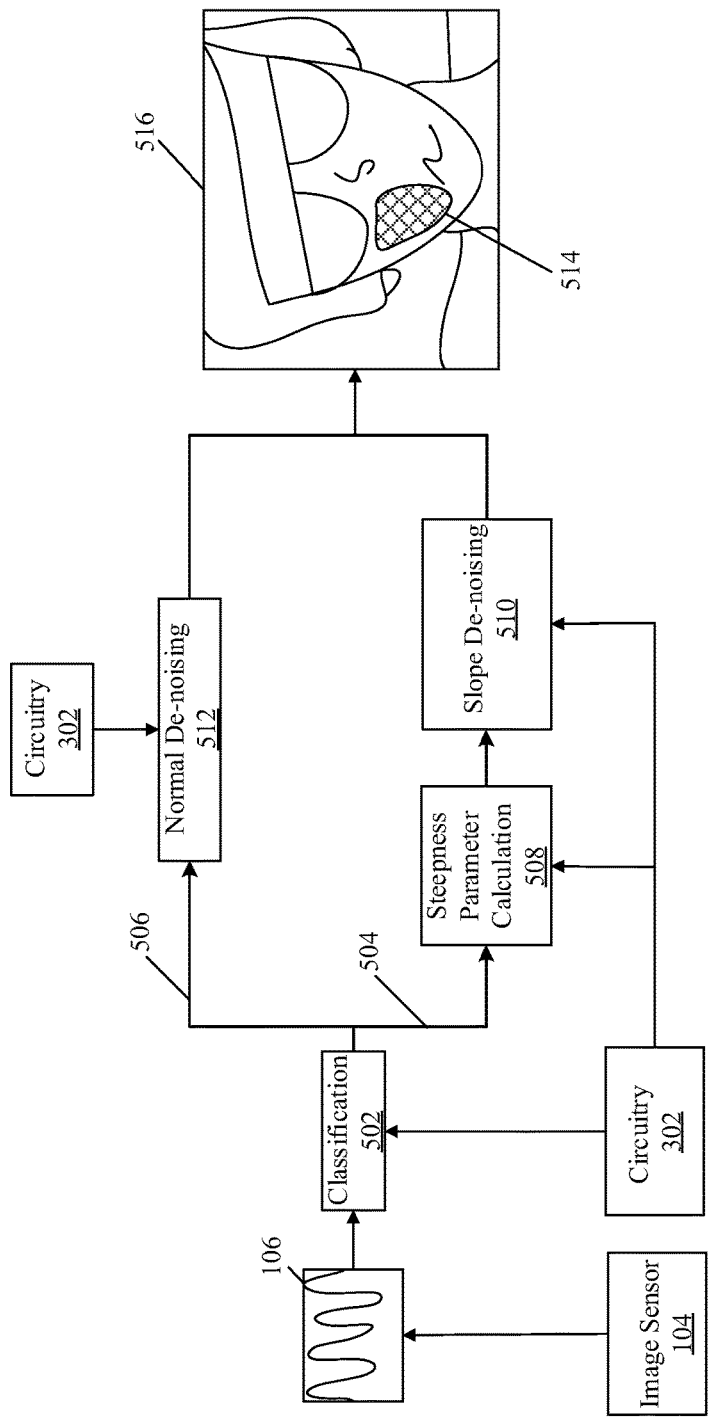
FIG. 5 illustrates exemplary operations of the image-processing apparatus of FIG. 3 for reduction of staircase artifacts from an image signal, in accordance with an embodiment of the disclosure.

FIG. 5 illustrates exemplary operations of the image-processing apparatus of FIG. 3 for reduction of staircase artifacts from an image signal, in accordance with an embodiment of the disclosure. Referring to FIG. 5, different operations 502 to 512 and 516, and a first region of interest 514, is shown. The image sensor 104 may be configured to capture the input image signal 106. The image sensor 104 may be configured to communicate the captured image signal to the circuitry 302.

At 502, the plurality of portions of the input image signal 106 may be classified into one of the first set of portions and the second set of portions. The circuitry 302 may be configured to classify the plurality of portions. The first set of portions may exhibit the staircase artifact. The second set of portions may be free of (without) the staircase artifact. The circuitry 302 may be configured to segregate the first set of portions that may exhibit the staircase artifact, to be processed in a first processing pipeline 504. The circuitry 302 may be further configured to segregate the second set of portions to be processed in a second processing pipeline 506.

At 508, the steepness parameter of the input image signal 106 may be calculated, as discussed in FIG. 3. The circuitry 302 may be configured to calculate the steepness parameter of the input image signal 106.

At 510, the slope signal may be generated based on the calculated steepness parameter. The circuitry 302 may be configured to generate the difference signal based on a difference between the input image signal 106 and the generated slope signal. The circuitry 302 may be configured to generate a de-noised difference signal based on the generated difference signal. The circuitry 302 may be configured to add the generated de-noised difference signal with the generated slope signal to generate a de-noised difference signal.

At 512, the de-noised image signal may be generated based on the input image signal 106. The circuitry 302 may be configured to generate the de-noised image signal based on the input image signal 106. At 516, the circuitry 302 may be configured to reduce staircase artifacts in a first region of interest 514 (e.g., a specific face region) in the input image signal 106.

Figure 6:
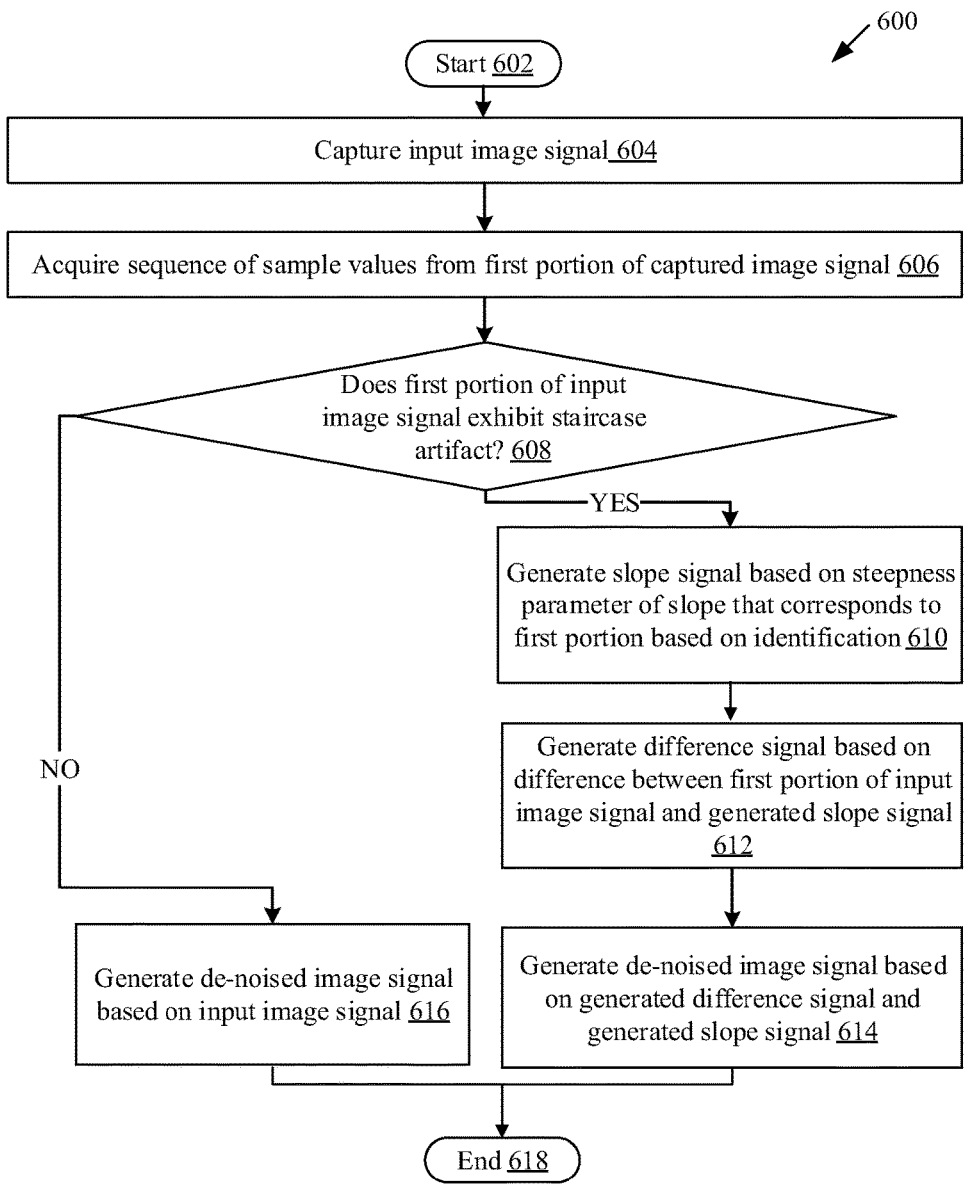
FIG. 6 depicts a first flow chart that illustrates an exemplary method to reduce staircase artifacts from an image signal, in accordance with an embodiment of the disclosure.

FIG. 6 depicts a first flow chart that illustrates an exemplary method to reduce staircase artifacts from an image signal, in accordance with an embodiment of the disclosure. With reference to FIG. 6, there is shown a flow chart 600. The flow chart 600 is described in conjunction with FIGS. 1, 2, 3, 4A, 4B, 4C, and 5. The method starts at 602 and proceeds to 604.

At 604, the input image signal 106 may be captured from a field-of-view of the image sensor 104. The image sensor 104 may be configured to capture the input image signal 106. The I/O device 308 in the image-processing apparatus 102 may be configured to receive the captured input image signal 106 from the image sensor 104. In some cases, a user of the image-processing apparatus 102 may point the image sensor 104 towards a particular scene to capture the input image signal 106 from the particular scene. The particular scene may be insufficiently illuminated and may include several low light regions. In accordance with an embodiment, the image-processing apparatus 102 may be configured to identify whether a first portion exhibits a staircase artifact or is free of the staircase artifact.

At 606, the sequence of sample values may be acquired from the first portion of the input image signal 106. The circuitry 302 may be configured to acquire the sequence of sample values from the input image signal 106.

At 608, it may be determined whether the first portion of the input image signal 106 exhibits the staircase artifact. To determine whether the first portion of the input image signal 106 may exhibit the staircase artifact, the circuitry 302 may be configured to detect whether the acquired sequence of sample values satisfies a defined set of criteria. In the case where the acquired sample values may satisfy the defined set of criteria, the image-processing apparatus 102 may be configured to determine that the first portion of the input image signal 106 may exhibit the staircase artifact. In such a case, the control may pass to 610. In case where the first portion exhibits the staircase artifact, the image-processing apparatus 102 may be configured to compute a steepness parameter for the first portion of the input image signal 106. The steepness parameter of the first portion of the input image signal 106 may indicate an average rate of variation of the input image signal. In the case where the acquired sequence of sample values fails to satisfy the defined set of criteria, the image-processing apparatus 102 may be configured to detect that the first portion may be free of staircase artifacts. In such a case, the control may pass to 616.

At 610, the slope signal may be generated based on the steepness parameter of a slope that corresponds to the first portion. The circuitry 302 may be configured to generate the slope signal such that rate of variation (increase or decrease) of the slope signal may correspond to the steepness parameter.

At 612, the difference signal may be generated based on difference between the first portion of the input image signal 106 and the generated slope signal. The circuitry 302 may be configured to generate the difference signal. The image-processing apparatus 102 may be configured to compute the difference between the first portion of the input image signal 106 and the generated slope signal. In one example, the image-processing apparatus 102 may be configured to compute the difference between the first portion of the input image signal 106 and the generated slope signal by subtraction of the generated slope signal from the input image signal 106. The circuitry 302 may be configured to de-noise the generated difference signal by use of image de-noising filters. In one example, the image-processing apparatus 102 may be configured to filter the generated difference signal based on one or more defined or particular parameters, by use of a digital filter, as discussed in FIG. 1. The image-processing apparatus 102 may be configured to de-noise the generated difference signal to generate a de-noised difference signal.

At 614, a de-noised image signal may be generated based on the generated difference signal and the generated slope signal, to reduce the staircase artifact in the first portion of the input image signal 106. The circuitry 302 may be configured to generate the de-noised image signal based on sum of the generated de-noised difference signal and the generated slope signal.

At 616, the de-noised image signal may be generated by the image-processing apparatus 102 based on the input image signal 106. The circuitry 302 may be configured to de-noise the input image signal 106 by use of the de-noising filters, as discussed in FIG. 1. The control may pass to end 618.

Figure 7A:
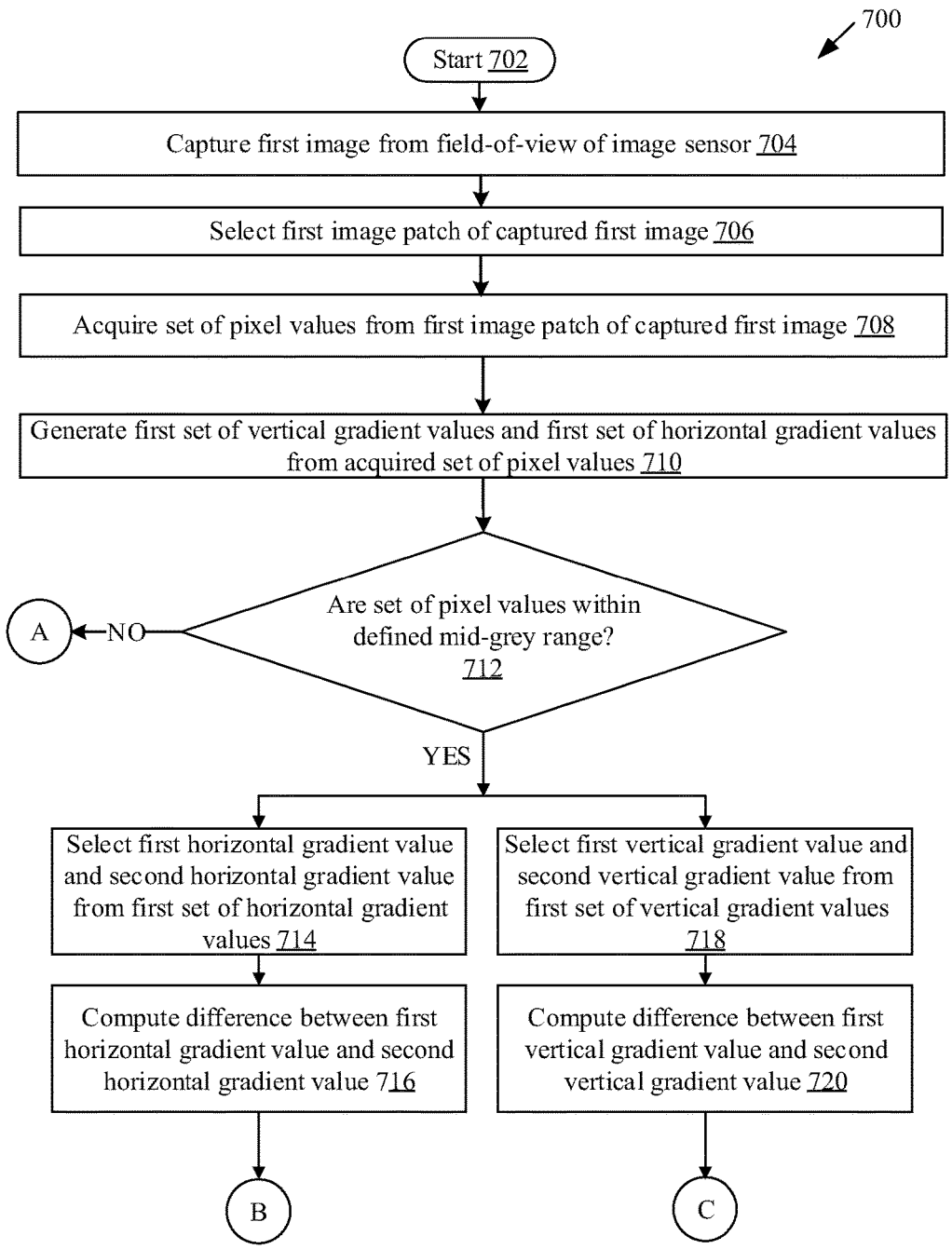
FIGS. 7A and 7B, collectively, depict a second flow chart that illustrates an exemplary method to reduce staircase artifacts from an image, in accordance with an embodiment of the disclosure.
Figure 7B:
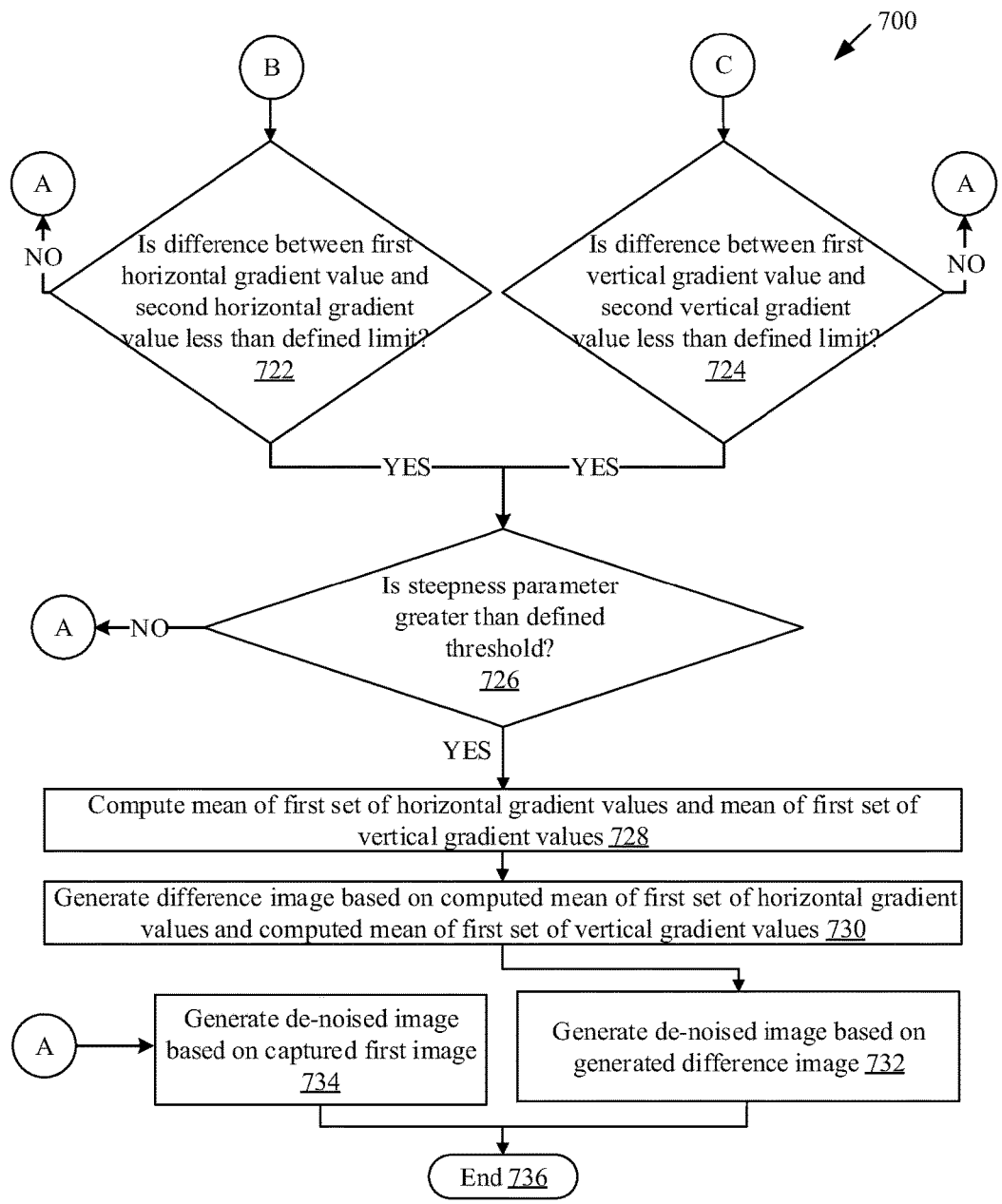

FIGS. 7A and 7B, collectively, depict a second flow chart that illustrates an exemplary method to reduce staircase artifacts from a two-dimensional (2D) image, in accordance with an embodiment of the disclosure. With reference to FIG. 7A, there is shown a flow chart 700. The flow chart 700 is described in conjunction with FIGS. 1, 2, 3, 4A, 4B, 4C, 5, 7A and 7B. The method starts at 702 and proceeds to 704.

At 704, a first image may be captured. The image sensor 104 of the image-processing apparatus 102 may be configured to capture the first image. The image sensor 104 may be configured to communicate the first image to the image-processing apparatus 102. The captured image may include a plurality of pixels and a plurality of pixel values associated with the plurality of pixels.

At 706, a first image-patch of the captured first image may be selected. The circuitry 302 may be configured to select the first image-patch. The first image-patch may be one of a plurality of image-patches in the captured first image.

At 708, a set of pixel values may be acquired from the first image-patch of the captured first image. The circuitry 302 may be configured to acquire the first image-patch from the captured first image.

At 710, a first set of horizontal gradient values and a first set of vertical gradient values may be generated from the acquired set of pixel values. The circuitry 302 may be configured to generate the first set of horizontal gradient values and the first set of vertical gradient values. To generate the first set of horizontal gradient values, the circuitry 302 may be configured to compute a difference between each pair of adjacent pixel values for each row of the first image patch. To generate the first set of vertical gradient values, the circuitry 302 may be configured to compute a difference between each pair of adjacent pixel values for each column of the first image patch.

At 712, it may be determined whether the set of pixel values are within a defined mid-grey range. The circuitry 302 may be configured to determine if the set of pixel values are within the defined mid-grey range. In certain scenarios, a mean of the set of pixel values may be compared with the defined mid-grey range. In the case where the mean value of the set of pixel values may be outside the defined mid-grey range, the control may pass to 734. One or more operations (such as 714, 716, and 722) may be executed concurrently with one or more other operations (such as 718, 720, and 724 by way of parallel processing. Therefore, in the case where the mean value of the set of pixel values may be within the defined mid-grey range, the control may simultaneously pass to 714 and 718.

At 714, a first horizontal gradient value and a second horizontal gradient value may be selected from the first set of horizontal gradient values. The circuitry 302 may be configured to select the first horizontal gradient value and the second horizontal gradient based on one or more parameters. For example, the first horizontal gradient value may be a second largest horizontal gradient value in the first set of horizontal gradient values. Similarly, the second horizontal gradient value may be a second lowest horizontal gradient value in the first set of horizontal gradient values.

At 716, a difference between the first horizontal gradient value and the second horizontal gradient value may be computed. The circuitry 302 may be configured to compute the difference between the first horizontal gradient value and the second horizontal gradient value to determine spatial consistency of the set of pixels. The control from 716 passes to 722.

At 722, it may be determined whether the difference between the first horizontal gradient value and the second horizontal gradient value is less than a defined limit. In the case where the difference between the first horizontal gradient value and the second horizontal gradient value may be lesser than the defined limit, control may pass to 726. In the case where the difference between the first horizontal gradient value and the second horizontal gradient value may be greater than the defined limit, control may pass to 734.

At 718, a first vertical gradient value and a second vertical gradient value may be selected from the first set of vertical gradient values. The circuitry 302 may be configured to select the first vertical gradient value and the vertical horizontal gradient value. The first vertical gradient value may be a second largest vertical gradient value in the first set of vertical gradient values. Similarly, the second vertical gradient value may be a second lowest vertical gradient value in the first set of vertical gradient values.

At 720, a difference between the first vertical gradient value and the second vertical gradient value may be computed. The circuitry 302 may be configured to calculate the difference between the first vertical gradient value and the second vertical gradient value, to determine spatial consistency of the set of pixels.

At 724, it may be determined whether the difference between the first vertical gradient value and the second vertical gradient value is lesser than the defined limit. In the case where the difference between the first vertical gradient value and the second vertical gradient value may be lesser than the defined limit, control may pass to 726. In the case where the difference between the first horizontal gradient value and the second horizontal gradient value is greater than the defined limit, control may pass to 734. In accordance with an embodiment, the circuitry 302 may be configured to identify the first vertical gradient, the second vertical gradient, the first horizontal gradient, and the second horizontal gradient as one of a positive gradient and a negative gradient.

At 726, it may be determined, as a fourth criteria of the defined set of criteria, whether a steepness parameter of the first portion the input image signal 106 may be greater than a defined threshold. The steepness parameter may indicate a rate at which the input image signal 106 varies (increases or decreases). In one example, the steepness parameter of the input image signal 106 may correspond to one of the first vertical gradient value (i.e. the second largest or third largest vertical gradient value), the second vertical gradient value (i.e. the second lowest or third lowest vertical gradient value), the first horizontal gradient value (i.e. the second largest or third largest horizontal gradient value), and the second horizontal gradient value (i.e. the second lowest or third lowest horizontal gradient value).

In cases where the first vertical gradient, the second vertical gradient, the first horizontal gradient, and the second horizontal gradient, are positive gradients, the circuitry 302 may be configured to detect whether the second vertical gradient value (i.e. the second lowest or third lowest vertical gradient value) or the second horizontal gradient value (i.e. the second lowest or third lowest horizontal gradient value) may be greater than a defined positive threshold (for example, 6). Alternatively stated, the circuitry 302 may be configured to detect whether an absolute value of the second vertical gradient value or the second horizontal gradient value may be greater than the defined positive threshold (for example, 6). In cases where the second vertical gradient value or the second horizontal gradient value may be greater than the defined positive threshold, the circuitry 302 may be configured to detect that the steepness parameter is greater than the defined threshold. In such cases, the first image patch of the captured image satisfies the fourth criteria.

In other cases where the first vertical gradient, the second vertical gradient, the first horizontal gradient, and the second horizontal gradient, are negative gradients, the circuitry 302 may be configured to detect whether the first vertical gradient value (i.e. the second largest or third largest vertical gradient value) or the first horizontal gradient value (i.e. the second largest or third largest horizontal gradient value) may be lesser than a defined negative threshold (for example, −6). Alternatively stated, the circuitry 302 may be configured to detect whether an absolute value of the first vertical gradient value and the first horizontal gradient value may be greater than the defined threshold (for example, 6). In cases where the first vertical gradient value or the first horizontal gradient value may be less than the defined negative threshold, the circuitry 302 may be configured to detect that the steepness parameter is greater than the defined threshold. In such cases, the first image patch of the captured image satisfies the fourth criteria. In the case where the steepness parameter is greater than the defined threshold, then the control may pass to 728. In the case where the steepness parameter may be less than the threshold, then the control may pass to 734.

At 728, a first computed mean of the first set of vertical gradient values and a second computed mean of the first set of horizontal gradient values may be computed. The circuitry 302 may be configured to compute the first computed mean and the second computed mean.

At 730, a difference image may be generated based on the first computed mean of the first set of vertical gradient values and the second computed mean of the first set of horizontal gradient values. The circuitry 302 may be configured to generate the difference image by modifying one or more pixel values in the first image-patch, based on the first computed mean and the second computed mean.

At 732, a de-noised image may be generated based on the generated difference image. The circuitry 302 may be further configured to de-noise the generated difference image by use of the de-noising filters to generate a de-noised difference image. The circuitry 302 may be configured to generate the de-noised image by modifying one or more pixel values in the generated de-noised difference image, based on the first computed mean and the second computed mean.

At 734, the de-noised image may be generated based on the captured first image. The circuitry 302 may be configured to generate the de-noise image by use of the digital filter on the captured first image, as discussed in FIG. 1. The control may pass to end 736.

Currently, an image captured at a low-light condition may comprise one or more regions with slow varying color or luminosity. In cases where the captured image is riddled with noisy patches, a conventional image-processing apparatus may de-noise the captured image. In such cases, the conventional image-processing apparatus may introduce certain undesired artifacts called staircase artifacts into the one or more regions. Existing image de-noising technologies may flatten one or more regions of an image signal, and thereby create staircase artifacts in the image signal. Consequently, the staircase artifacts may manifest in the one or more regions of the image signal, as undesired false steps or undesired flat regions in an otherwise smoothly varying image signal. Alternatively stated, traditional regular noise reduction approaches often generate "staircase"-like artifacts when trying reduce the noise on slow-varying signals (or slopes) in 1D signal, 2D image, and video. In addition, the locations of the staircase steps may change from one video frame to another, which results significant temporal fluctuation in video denoising results.

In accordance with an embodiment of the disclosure, an image-processing apparatus (such as image-processing apparatus 102 (FIG. 1)) to reduce staircase artifacts in an image signal may include an image sensor (such as the image sensor 104 (FIG. 1)) and a circuitry (such as the circuitry 302 (FIG. 3)). The image sensor 104 may be configured to capture an input image signal (such as the input image signal 106 (FIG. 1)). The circuitry 302 may be configured to determine or identify a first portion of the input image signal 106 that exhibits a staircase artifact. The circuitry 302 may be further configured to generate a slope signal based on a steepness parameter of a slope that corresponds to the first portion based on the determination or identification. The circuitry 302 may be configured to generate a difference signal based on a difference between the first portion of the input image signal 106 and the generated slope signal. Further, the circuitry 302 may be configured to generate a de-noised image signal based on the generated difference signal and the generated slope signal to reduce the staircase artifact in the first portion of the input image signal 106. Thus, to reduce or remove the staircase artifacts in an image signal, the disclosed image-processing apparatus 102 provides a new classification-based approach to identify such slow-varying slopes and estimate the steepness of the slope. The circuitry 302 first accurately determines or identifies certain regions (such as the first portion) of the input image signal 106 that exhibits the staircase artifact. The first portion may be slow-varying slopes. The identification of the first portion of the input image signal 106 as that exhibits the staircase artifact is based on a defined set of criteria, as discussed in the FIGS. 1, 2, 3, 4A, 4B, 4C, 5, 6, 7A, and 7B.

The circuitry 302 may be configured to classify a plurality of portions of the input image signal 106 that exhibits the staircase artifact and that is free of the staircase artifact, based on the identification of one or more region-of-interests that exhibits the staircase artifact. The one or more region-of-interests may be the slow-varying slopes including the identified first portion that exhibits the staircase artifact. Once the determination or the identification of the first portion that exhibits the staircase artifact is done automatically by the circuitry 302, a steepness parameter of a slope (or steepness of a slope) of the first portion of the input image signal 106 may be determined. Based on this steepness parameter of the slope, a new information such as the slope signal may be generated. Thereafter, a regular denoising approach can be used to denoise the difference of noisy signal (such as the input image signal 106) and the generated slope signal instead of being applied to noisy signal directly.

In conventional techniques, denoising is done directly on the noisy signal (such as the input image signal 106 that have the first portion as noise). This increases the manifestation of the staircase artifacts. In contrast, the circuitry 302 of the disclosed image-processing apparatus 102 generates a difference signal based on a difference between the first portion of the input image signal 106 and the generated slope signal. Instead of denoising a noisy signal directly as in conventional systems, the disclosed image-processing apparatus 102 generates a de-noised image signal based on the generated difference signal and the generated slope signal to reduce or remove the staircase artifact in the first portion of the input image signal 106.

The circuitry 302 provides an ability to the image-processing apparatus 102 to accurately identify (or determine) which portions of an input image signal 106 may exhibit staircase artifact (a noisy signal). Thereafter, the circuitry 302 further provides an ability to the image-processing apparatus 102 to efficiently and effectively denoise the input image signal 106, by generating a denoised slope by sum of the denoised difference signal and the generated slope signal. Such denoised slopes suffer much less from the "staircase" artifacts, and provides significant improvement in image quality in 1D signal, 2D image, and also video. This in turn also significantly reduces temporal fluctuation in video denoising results.

Various embodiments of the disclosure may provide a non-transitory computer readable medium and/or storage medium having stored thereon, a set of instructions executable by a machine and/or a computer to reduce staircase artifacts from an image signal. The at least one code section may cause the machine and/or computer to perform the steps that comprise capture of an input image signal with an image sensor. The operations may further comprise identification of a first portion of the input image signal that may exhibit a staircase artifact and generation of a slope signal based on a steepness parameter of a slope that corresponds to the first portion based on the identification. The operations may further comprise generation of a difference signal based on a difference between the first portion of the input image signal and the generated slope signal. Further, the operations may comprise generation of a de-noised image signal based on the generated difference signal and the generated slope signal to reduce the staircase artifact in the first portion of the input image signal.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which, when loaded in a computer system, is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without deviation from the scope of the present disclosure. In addition, many modifications may be made to adapt a particular situation or material to the teachings of the present disclosure without deviation from its scope. Therefore, it is intended that the present disclosure not be limited to the particular embodiment disclosed, but that the present disclosure will include all embodiments falling within the scope of the appended claims.

What is claimed is:

1. An image-processing apparatus, comprising:
an image sensor configured to capture an input image signal;
and circuitry configured to:
classify a plurality of portions of the input image signal that exhibits a staircase artifact and that is free of the staircase artifact;
identify at least a first portion that exhibits the staircase artifact from the plurality of portions of the input image signal, wherein the identified the at least the first portion is a slow-varying slope region that is prone to the staircase artifact in the input image signal;
generate a slope signal based on a steepness parameter of a slope that corresponds to the first portion, based on the identification;
generate a difference signal based on a difference between the first portion of the input image signal and the generated slope signal; and output a de-noised image signal based on the generated difference signal and the generated slope signal to minimize the staircase artifact in the at least the first portion of the input image signal.

2. The image-processing apparatus of claim 1, wherein the plurality of portions of the input image signal are classified based on an identification of one or more region-of-interests that exhibits the staircase artifact, wherein the one or more region-of-interests are slow-varying slope regions and includes a first region-of-interest that corresponds to the identified first portion that exhibits the staircase artifact.

3. The image-processing apparatus of claim 2, wherein the circuitry is further configured to segregate one or more portions of the plurality of portions of the input image signal that exhibits the staircase artifact, to be processed in a first processing pipeline, and remaining one or more portions of the plurality of portions that are free of the staircase artifact to be processed in a second processing pipeline that is different from the first processing pipeline, based on the classification of the plurality of portions of the input image signal.

4. The image-processing apparatus of claim 1, wherein the circuitry is further configured to acquire sample values from the first portion of the input image signal that is a one-dimensional (1D) signal or a two-dimensional (2D) image signal for the identification of the first portion that exhibits the staircase artifact.

5. The image-processing apparatus of claim 4, wherein the circuitry is further configured to generate a first set of horizontal gradient values and a first set of vertical gradient values based on the acquired sample values of the first portion of the input image signal.

6. The image-processing apparatus of claim 5, wherein the circuitry is further configured to compute the steepness parameter based on a first computed mean of the first set of vertical gradient values and a second computed mean of the first set of horizontal gradient values.

7. The image-processing apparatus of claim 5, wherein the first portion of the input image signal corresponds to a first image patch of an image captured by the image sensor, and
wherein the circuitry is further configured to compute a difference between each pair of adjacent pixel values for each row of the first image patch to generate the first set of horizontal gradient values, and
wherein the circuitry is further configured to compute a difference between each pair of adjacent pixel values for each column of the first image patch to generate the first set of vertical gradient values.

8. The image-processing apparatus of claim 5, wherein the identification of the first portion that exhibits the staircase artifact is based on a defined set of criteria, wherein the circuitry is further configured to determine, as a first criteria of the defined set of criteria, whether a mean value of a set of pixel values of the first image patch are within a defined mid-gray range.

9. The image-processing apparatus of claim 8, wherein the circuitry is further configured to determine, as a second criteria of the defined set of criteria, whether a difference between a first horizontal gradient value and a second horizontal gradient value of the first set of horizontal gradient values, is less than a defined limit.

10. The image-processing apparatus of claim 8, wherein the circuitry is further configured to determine, as a third criteria of the defined set of criteria, whether a difference between a first vertical gradient value and a second vertical gradient value of the first set of vertical gradient values, is less than a defined limit.

11. The image-processing apparatus of claim 8, wherein the circuitry is further configured to determine, as a fourth criteria of the defined set of criteria, the steepness parameter of the slope that is greater than a threshold based on the first set of horizontal gradient values and the first set of vertical gradient values.

12. A method for reducing staircase artifacts, comprising:
in an image-processing apparatus comprising an image sensor and a circuitry:
capturing, by the circuitry, an input image signal via the image sensor;
classifying, by the circuitry, a plurality of portions of the input image signal that exhibits a staircase artifact and that is free of the staircase artifact;
identifying, by the circuitry, at least a first portion from the plurality of portions of the input image signal to exhibit the staircase artifact, wherein the identified the at least the first portion is a slow-varying slope region that is prone to the staircase artifact in the input image signal;
generating, by the circuitry, a slope signal based on a steepness parameter of a slope that corresponds to the first portion, based on the identification;
generating, by the circuitry, a difference signal based on a difference between the first portion of the input image signal and the generated slope signal; and
outputting, by the circuitry, a de-noised image signal based on the generated difference signal and the generated slope signal to minimize the staircase artifact in the at least the first portion of the input image signal.

13. The method of claim 12, wherein the plurality of portions of the input image signal are classified based on an identification of one or more region-of-interests that exhibits the staircase artifact, wherein the one or more region-of-interests are slow-varying slope regions and includes a first region-of-interest that corresponds to the identified first portion that exhibits the staircase artifact.

14. The method of claim 13, further comprising, segregating, by the circuitry, one or more portions of the plurality of portions of the input image signal that exhibits the staircase artifact, to be processed in a first processing pipeline, and remaining one or more portions of the plurality of portions of the input image signal that are free of the staircase artifact, to be processed in a second processing pipeline, that is different from the first processing pipeline, based on the classification of the plurality of portions of the input image signal.

15. The method of claim 12, further comprising acquiring, by the circuitry, sample values from the first portion of the input image signal that is a one-dimensional (1D) signal or a two-dimensional (2D) image signal for the identification of the first portion of the input image signal as that exhibits the staircase artifact.

16. The method of claim 15, further comprising generating, by the circuitry, a first set of horizontal gradient values and a first set of vertical gradient values based on the acquired sample values of the first portion of the input image signal.

17. The method of claim 16, further comprising computing, by the circuitry, the steepness parameter based on a first computed mean of the first set of vertical gradient values and a second computed mean of the first set of horizontal gradient values.

18. The method of claim 16, wherein the first portion of the input image signal corresponds to a first image patch of an image captured by the image sensor, and wherein the circuitry is further configured to compute a difference between each pair of adjacent pixel values for each row of the first image patch to generate the first set of horizontal gradient values, and wherein the circuitry is further configured to compute a difference between each pair of adjacent pixel values for each column of the first image patch to generate the first set of vertical gradient values.

19. The method of claim 16, wherein the identification of the first portion of the input image signal as that exhibits the staircase artifact is based on a defined set of criteria, wherein whether a mean value of a set of pixel values of the first image patch are within a defined mid-gray range, is determined as a first criteria of the defined set of criteria.

20. The method of claim 19, further comprising determining, by the circuitry, as a second criteria of the defined set of criteria, whether a difference between a first horizontal gradient value and a second horizontal gradient value of the first set of horizontal gradient values, is less than a defined limit.

21. The method of claim 19, further comprising determining, by the circuitry, as a third criteria of the defined set of criteria, whether a difference between a first vertical gradient value and a second vertical gradient value of the first set of vertical gradient values, is less than a defined limit.

22. The method of claim 19, further comprising determining, by the circuitry, as a fourth criteria of the defined set of criteria, whether the steepness parameter of the slope is greater than a threshold based on the first set of horizontal gradient values and the first set of vertical gradient values.

* * * * *